United States Patent
Kaufleitner

(10) Patent No.: US 9,021,167 B2
(45) Date of Patent: Apr. 28, 2015

(54) METHOD AND A BUS DEVICE FOR TRANSMITTING SAFETY-ORIENTED DATA

(71) Applicant: Bernecker + Rainer Industrie-Elektronik Ges.m.b.H., Eggelsberg (AT)

(72) Inventor: Franz Kaufleitner, Hochburg-Ach (AT)

(73) Assignee: Bernecker + Rainer Industrie-Elektronik Ges.m.b.H., Eggelsberg (AT)

(*) Notice: Subject to any disclaimer, the term of this patent is extended or adjusted under 35 U.S.C. 154(b) by 188 days.

(21) Appl. No.: 13/661,698

(22) Filed: Oct. 26, 2012

(65) Prior Publication Data
US 2013/0111087 A1    May 2, 2013

(30) Foreign Application Priority Data
Oct. 27, 2011    (AT) .................... 1582/2011

(51) Int. Cl.
*H04L 12/40*    (2006.01)
*H04L 29/06*    (2006.01)

(52) U.S. Cl.
CPC ......... *H04L 12/40* (2013.01); *H04L 2012/4026* (2013.01); *H04L 63/16* (2013.01); *H04L 63/168* (2013.01)

(58) Field of Classification Search
CPC ........ H04L 63/16; H04L 63/168; H04L 12/40
USPC ................................. 710/315, 105
See application file for complete search history.

(56) References Cited

U.S. PATENT DOCUMENTS

| | | | |
|---|---|---|---|
| 2009/0105849 A1* | 4/2009 | Glanzer et al. | 700/21 |
| 2010/0191875 A1* | 7/2010 | Beyer et al. | 710/30 |
| 2012/0304292 A1* | 11/2012 | Liu et al. | 726/22 |

OTHER PUBLICATIONS

"OpenSAFETY—the key to your safety solution"; Ethernet Powerlink Facts: The Magazine for the Industrial Ethernet Standard; vol. 5, Issue 1; pp. 1-20; EPSG—Ethernet Powerlink Standardization Group; Berlin, Germany; Apr. 2010.*
Ethernet Powerlink Safety Profile Specification, V 1.1.1.

* cited by examiner

*Primary Examiner* — Glenn A Auve
(74) *Attorney, Agent, or Firm* — Greenblum & Bernstein, P.L.C.

(57) ABSTRACT

Safe bus devices use a safety protocol in order to transmit safe data encapsulated in an industrial Ethernet message via an Ethernet-based field bus. However, this restricts the safe bus device to a certain combination of safety protocol and industrial Ethernet protocol. In order to be able to use a safe bus device $12, 14, 15_1$ more flexibly, it is provided that, to transmit the safety-oriented data, the industrial Ethernet protocol uses the session layer 5 and/or presentation layer 6 of the safety protocol, which is independent of the industrial Ethernet protocol, instead of the session layer 5 and/or presentation layer 6 which is implemented in the industrial Ethernet protocol, whereby such a bus device $12, 14, 15_1$ becomes independent of the industrial Ethernet protocol.

2 Claims, 2 Drawing Sheets

| | | |
|---|---|---|
| 7 | Safety protocol e.g. OpenSAFETY | Industrial Ethernet e.g. Ethernet/IP |
| 6 | Safety protocol e.g. OpenSAFETY | Industrial Ethernet e.g. CIP |
| 5 | | |
| 4 | TCP | UDP |
| 3 | IP | |
| 2 | Ethernet | |
| 1 | | |

| 7 | Ethernet/IP | OpenSAFETY |
|---|---|---|
| 6 | CIP (Common Industrial Protocol) | |
| 5 | | |
| 4 | TCP | UDP |
| 3 | IP | |
| 2 | Ethernet | |
| 1 | | |

Fig. 1

(Prior art)

| 7 | Safety protocol e.g. OpenSAFETY | | Industrial Ethernet e.g. Ethernet/IP |
|---|---|---|---|
| 6 | Safety protocol e.g. OpenSAFETY | | Industrial Ethernet e.g. CIP |
| 5 | | | |
| 4 | TCP | UDP | |
| 3 | IP | | |
| 2 | Ethernet | | |
| 1 | | | |

Fig. 2

METHOD AND A BUS DEVICE FOR TRANSMITTING SAFETY-ORIENTED DATA

CROSS-REFERENCE TO RELATED APPLICATIONS

The present application claims priority under 35 U.S.C. §119(a) of Austrian Patent Application No. A 1582/2011 filed Oct. 27, 2011, the disclosure of which is expressly incorporated by reference herein in its entirety.

BACKGROUND OF THE INVENTION

1. Field of the Invention

The present invention relates to a method and a bus device for transmitting safety-oriented data of a safety protocol in a field bus using an industrial Ethernet protocol.

2. Discussion of Background Information

Industrial Ethernet protocols, such as for example POWERLINK, Ethernet IP, ProfiNet, Ethercat, etc., are established in the automation field and are used for the standardized exchange of data between bus nodes in a field bus system. However, these protocols alone are not suitable for transmitting safety-related data, e.g. as defined by the international norm IEC 61508 or other safety-related norms. A safety protocol, such as for example OpenSAFETY, ProfiSafe, CIP-safety, Safety over Ethercat, etc., which safeguards the data in accordance with the safety requirements, is normally used for this purpose. The transmitted data are safeguarded against data errors, data loss and transmission errors by the safety protocol in order to be able to ensure correct transmission of the data within the intended transmission times. For this purpose, the safety protocol is provided with appropriate mechanisms, which enable possible transmission errors to be detected and corrected. In doing so, the data of the safety protocol are transmitted encapsulated in a conventional Ethernet message. Such industrial Ethernet protocols and safety protocols are sufficiently well-known, for which reason they will not be dealt with in more detail here.

Data communication protocols follow the well-known OSI layer model. Layers 1 and 2, that is to say the physical transmission layer and the data link layer, are the same for all industrial Ethernet protocols. As a basic principle therefore, all these industrial Ethernet protocols can be transmitted on the same Ethernet-based field bus. Layers 3 and 4, that is to say the network layer and the transport layer, are present in many standardized forms, such as TCP/IP or UDP/IP for example. As a rule, industrial Ethernet protocols use these standardized layers 3 and 4, but could also use dedicated specially developed layers 3 and 4. However, layers 5 and 6, that is to say the session layer and the presentation layer, are usually already specified and therefore fixed by the chosen industrial Ethernet. Every industrial Ethernet protocol is subject to a standardization committee which is responsible for specifying these layers 5 and 6. These layers 5 and 6 are therefore not accessible to users of the industrial Ethernet protocol. The software which is used to access the Ethernet bus, e.g. the automation software, runs in layer 7, the application layer. A safety protocol also runs in the application layer 7, i.e. all safety-oriented mechanisms of the safety protocol are implemented in the application layer 7 and safety-oriented data of the safety protocol are transmitted encapsulated in a message of the industrial Ethernet protocol. This is explained in FIG. 1 with reference to the OpenSAFETY safety protocol, which is transmitted with the Ethernet/IP industrial Ethernet protocol. OpenSAFETY is implemented in the application layer 7 where, for example, it uses the standardized CIP (Common Industrial Protocol) of the known Ethernet/IP protocol in layers 5 and 6. The safety-oriented message of the OpenSAFETY protocol is transmitted encapsulated in a TCP/IP or UDP/IP message via an Ethernet bus.

Because of the situation described above, it is possible for different safety-oriented protocols to be transmitted on the same Ethernet bus, as the layers 1 and 2 are identical. However, when transmitting safety-related data in different industrial Ethernet networks, it is necessary to make modifications in layers 5 and 6 and possibly also in layer 7 and/or to implement an intermediate layer for data conversion. Direct communication between bus nodes, which although they use the same safety protocol (e.g. OpenSAFETY) use different industrial Ethernet protocols (e.g. Ethernet/IP or PROFINET), is therefore likewise impossible. That is to say, a bus node, on which OpenSAFETY for Ethernet/IP is implemented, is unable to communicate with a node which has OpenSAFETY for PROFINET implemented. Flexibility in the application of safety protocols is therefore very restricted, or special gateways which connect different buses to one another must be provided, which in turn is laborious. Furthermore, a bus device which has a certain safety protocol implemented must be developed for every conceivable industrial Ethernet protocol, which leads to a multiplicity of variants of a bus device and requires considerable development and maintenance effort.

Added to this is the fact that safety protocols, such as OpenSAFETY for example, may have their own layers 5 and 6 implemented in order to implement the safety mechanisms. A safety-oriented message according to the chosen safety protocol is consequently packed in a secure data frame, which also includes information of layers 5 and 6 of the safety protocol. This secure message is then transmitted encapsulated in the chosen industrial Ethernet protocol, in which the secure message again contains information of layers 5 and 6 of the industrial Ethernet protocol. However, this results in an increased data overhead which understandably reduces the available data rate.

SUMMARY OF THE EMBODIMENTS

It is therefore an object of the present invention to eliminate the disadvantages quoted above of known safety protocols which use an industrial Ethernet protocol as the transport means.

According to the invention, this object is achieved in that, in order to transmit the safety-oriented data, the industrial Ethernet protocol uses the session layer and/or presentation layer of the safety protocol, which is independent of the industrial Ethernet protocol, instead of the session layer and/or presentation layer which is implemented in the industrial Ethernet protocol. In this way, the transmission method and the bus device become independent of the specific form of the industrial Ethernet protocol, and can therefore be used in any industrial Ethernet protocol without substantial modification. It is therefore no longer necessary for a safe bus device, which has a certain safety protocol implemented, to be developed for every conceivable industrial Ethernet protocol, e.g. OpenSAFETY for PROFINET, OpenSAFETY for Ethernet/IP, etc., and it is sufficient for a safe bus device to be developed once, as this can then be used in any industrial Ethernet. This saves considerable development costs, and such a bus device can be used extremely flexibly.

Other exemplary embodiments and advantages of the present invention may be ascertained by reviewing the present disclosure and the accompanying drawing.

BRIEF DESCRIPTION OF THE DRAWINGS

The present invention is described with reference to the schematic and exemplary FIGS. 1 to 3, which show an advantageous embodiment of the invention. In the drawing:

FIG. 1 shows the layer model of a safety protocol based on OpenSAFETY according to the prior art, FIG. 2 shows the layer model of a safety protocol based on OpenSAFETY according to the invention.

DETAILED DESCRIPTION OF THE EMBODIMENTS

Figure 3:
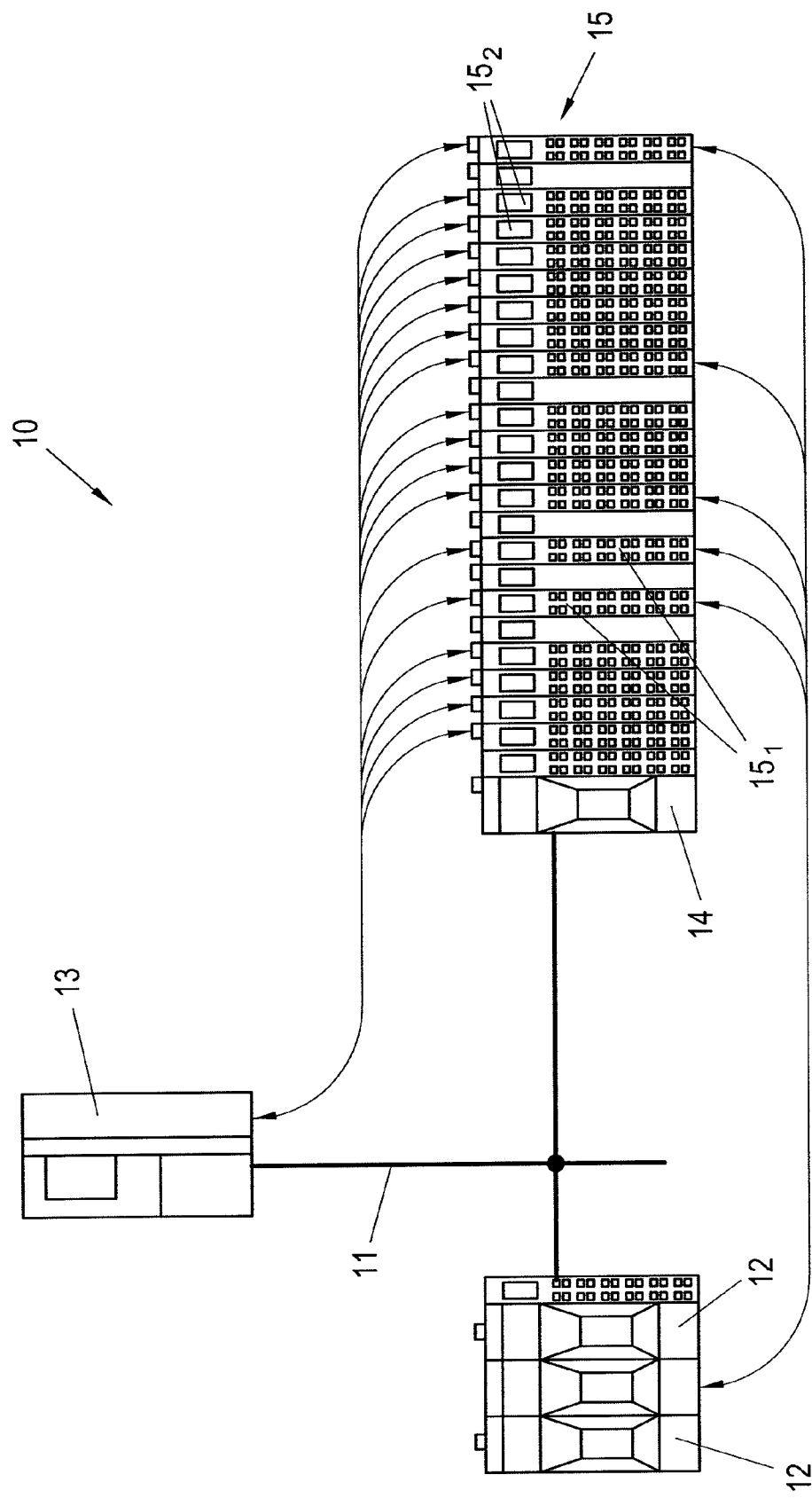
FIG. 3 shows a typical embodiment of a field bus for an automation task.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The basic idea of the invention can be seen in FIG. 2. As before, the data communication according to the invention is shown in accordance with the known layer model. The safety protocol, here OpenSAFETY, with all the necessary safety mechanisms, is again implemented in the application layer 7. However, the safety layer 5 and presentation layer 6 of the safety protocol, which are likewise defined in the safety protocol (OpenSAFETY), are now used instead of the standardized non-open CIP protocol in layers 5 and 6. This is dependent on the industrial Ethernet protocol and is advantageously an open standard, i.e. freely accessible for all users within the specifications of the open standard.

It can also be sufficient to implement only the safety layer 5 or the presentation layer 6 for data communication. Of course, it is also sufficient in this case if only the safety layer 5 or the presentation layer 6 of the safety protocol is used for data communication.

FIG. 3 shows a typical configuration of a field bus 10 in an automation environment. Sensors or actuators, which are not shown here, are connected in a manner which is known per se to a number of I/O units 15. The sensors and actuators communicate with control devices 12, 13, which control the automation tasks. Communication takes place via a field bus 11, to which all bus nodes are connected. The I/O units 15 can be designed for direct communication with the control devices 12, 13, or it can be provided that a bus controller 14 undertakes the communication between the control devices 12, 13 and the individual I/O units 15, as shown in FIG. 3. For this purpose, the bus controller 14 exchanges data with the I/O units 15 via a data bus of a backplane, and connects the I/O units 15 to the field bus 11. For better understanding, the arrows shown in FIG. 3 show only the logical access of the control devices to the I/O units 15; communication takes place via the field bus 11.

Safe control devices 12, which communicate with safe I/O units $15_1$ or other safe bus nodes, are now operated on the field bus 11. A safety protocol, e.g. OpenSAFETY, is implemented in the control devices 12 and in the safe I/O units $15_1$ and in the bus controller 14 for this purpose. The safe data are transmitted via TCP/IP or UDP/IP on the field bus 11 in a protocol, such as OpenSAFETY for example, which is independent of the industrial Ethernet protocol used, such as PROFINET for example, (as shown in FIG. 2), wherein "transmitted" is understood to mean both the transmitting and receiving of data. Non-safe bus nodes, such as a non-safe control device 13 and non-safe I/O units $15_2$, can also be operated on the field bus 11. The industrial Ethernet protocol, e.g. PROFINET, is implemented on these non-safety devices for this purpose.

In the case of a bus controller 14, both the safety protocol and the industrial Ethernet protocol must be implemented thereon in order to be able to communicate with both.

Instead of the session layer and/or presentation layer (layers 5 and 6 in the OSI model) of the industrial Ethernet protocol, the session layer and/or presentation layer of the safety protocol, which is independent of the industrial Ethernet protocol, is implemented in the safe control devices 12 and/or in the bus controller 14 and/or the safe I/O units $15_1$ or other safe bus devices. By this means, the safe bus device becomes independent of the industrial Ethernet and can be used in any industrial Ethernet without substantial modifications having to be made. That is to say, for example, that a device on which OpenSAFETY is implemented as a safety protocol and which also uses layers 5 and 6 of the safety protocol is able to communicate via the field bus 11 with every other bus device designed in this way, namely independently of the actual form of the industrial Ethernet protocol—the device is therefore independent of the industrial Ethernet protocol.

Of course, as well as layers 5 and 6 of the safety protocol, layers 5 and 6 of an industrial Ethernet protocol can also be implemented in the bus device, e.g. CIP of the Ethernet/IP protocol, as shown in FIG. 2. Such a bus device could therefore also communicate with conventional safe or non-safe bus devices which use the layers of the industrial Ethernet protocol as session layer and/or presentation layer. This makes the use of such a bus device even more flexible.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The invention claimed is:

1. A method for transmitting safety-oriented data of a safety protocol in a field bus using an industrial Ethernet protocol, comprising:

to transmit the safety-oriented data, the industrial Ethernet protocol uses a session layer and/or presentation layer of the safety protocol, which is independent of the industrial Ethernet protocol, instead of a session layer and/or presentation layer which is implemented in the industrial Ethernet protocol.

2. A bus device for a field bus for transmitting safety-oriented data of a safety protocol using an industrial Ethernet protocol, comprising:
 the safety protocol being implemented in the bus device; and
 a session layer and/or presentation layer of the safety protocol, which is independent of the industrial Ethernet protocol, is implemented in the bus device instead of a session layer and/or presentation layer of the industrial Ethernet protocol.

* * * * *